July 29, 1941.　　A. LYSHOLM ET AL　　2,250,543
SELF-PROPELLED RAIL VEHICLE
Filed June 6, 1938　　4 Sheets-Sheet 1
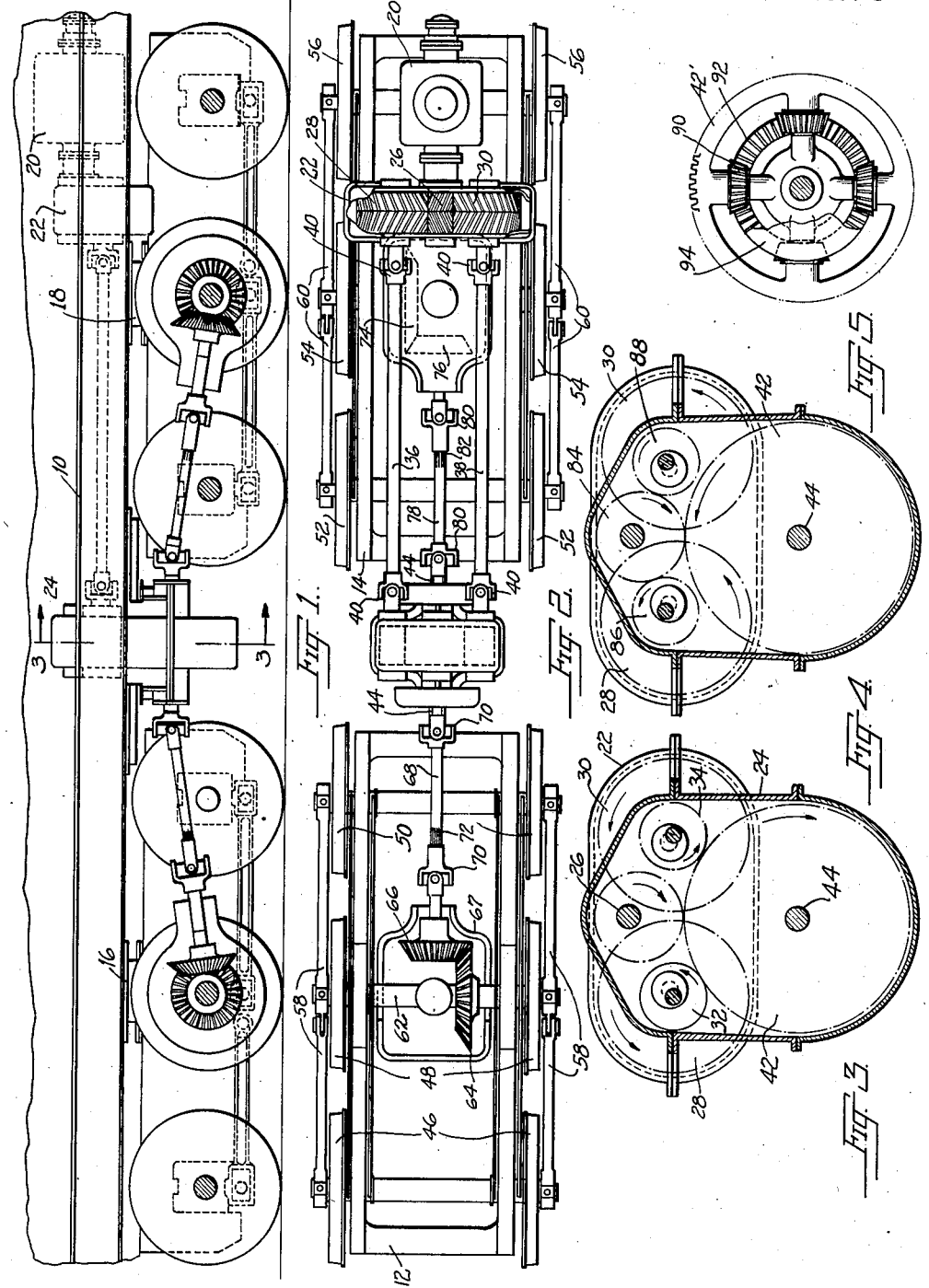
INVENTORS
BY
ATTORNEY

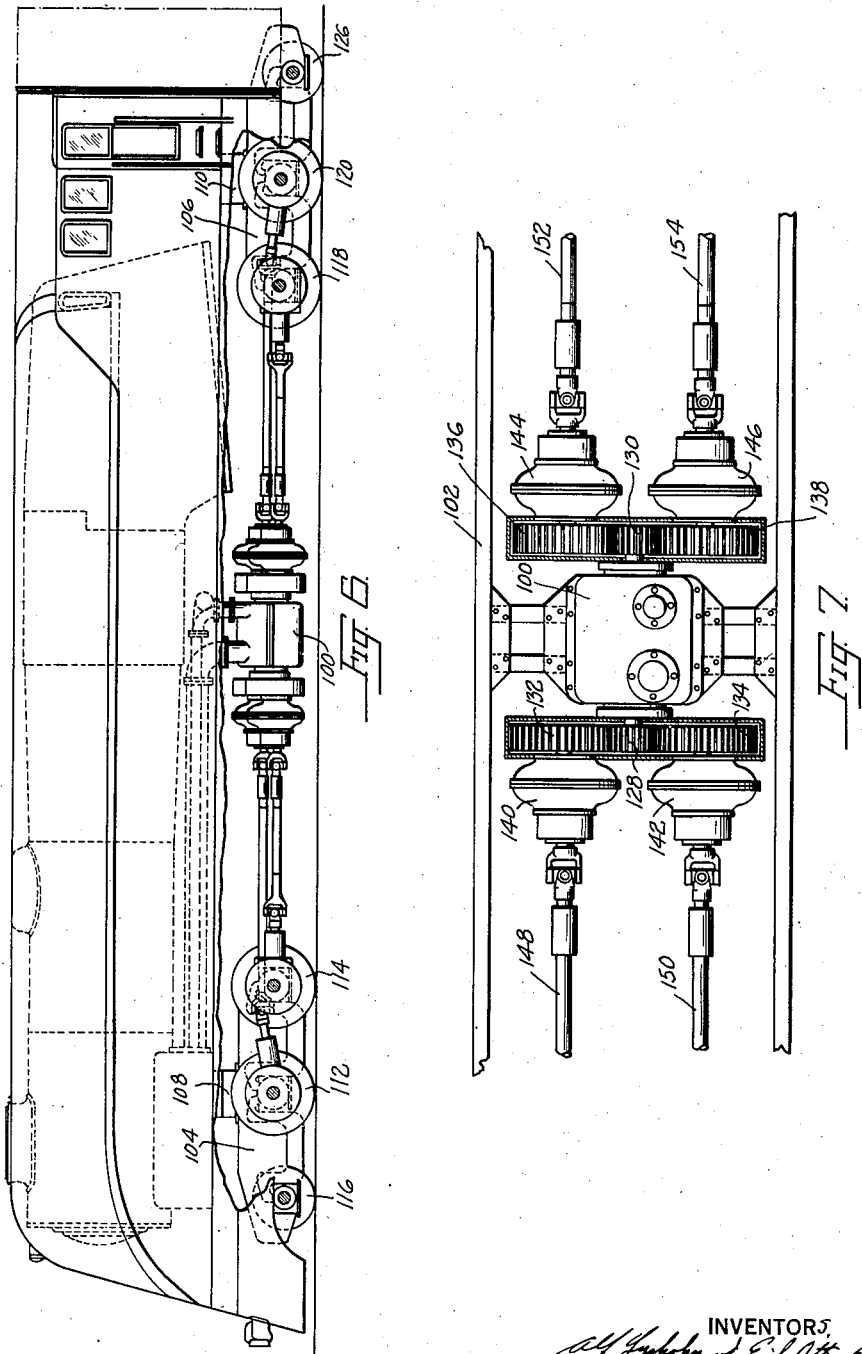

July 29, 1941.  A. LYSHOLM ET AL  2,250,543
SELF-PROPELLED RAIL VEHICLE
Filed June 6, 1938   4 Sheets-Sheet 3
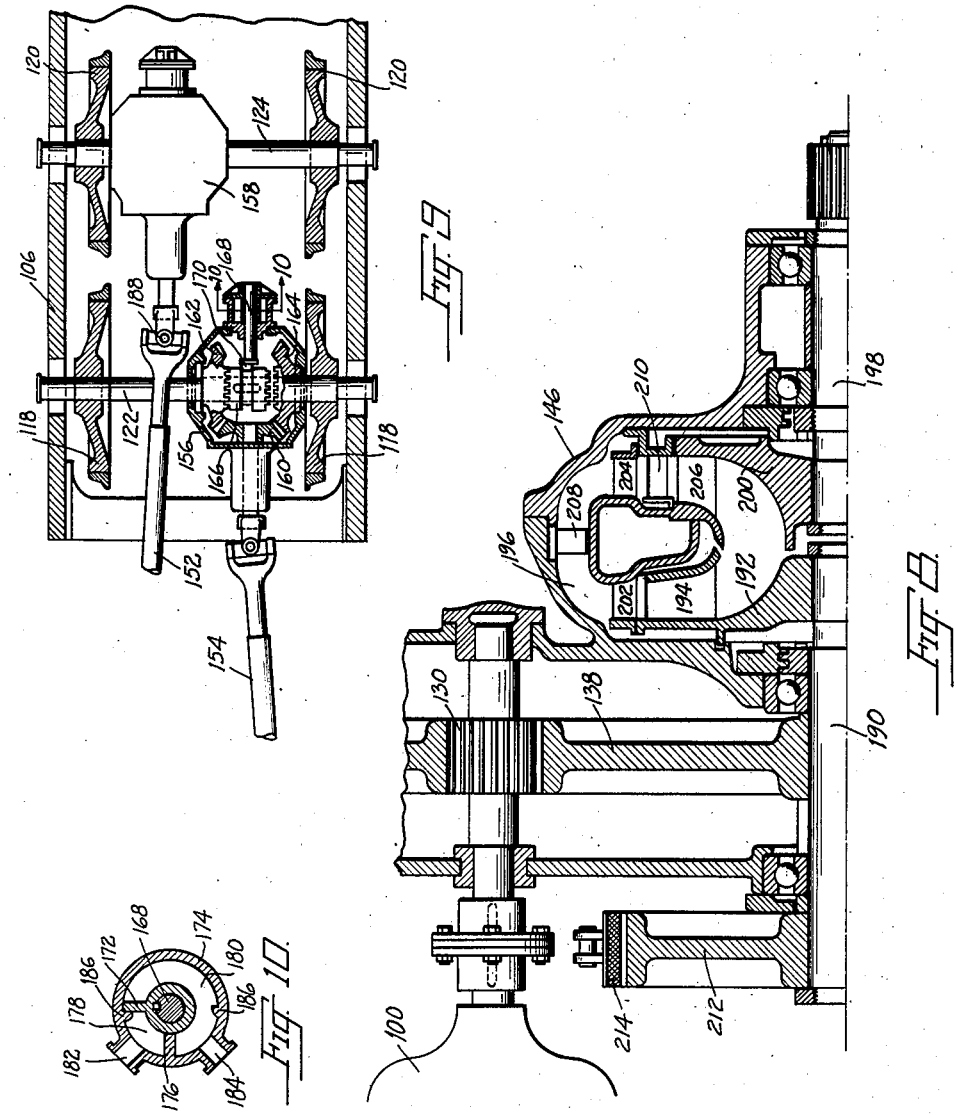
INVENTORS
BY
ATTORNEY

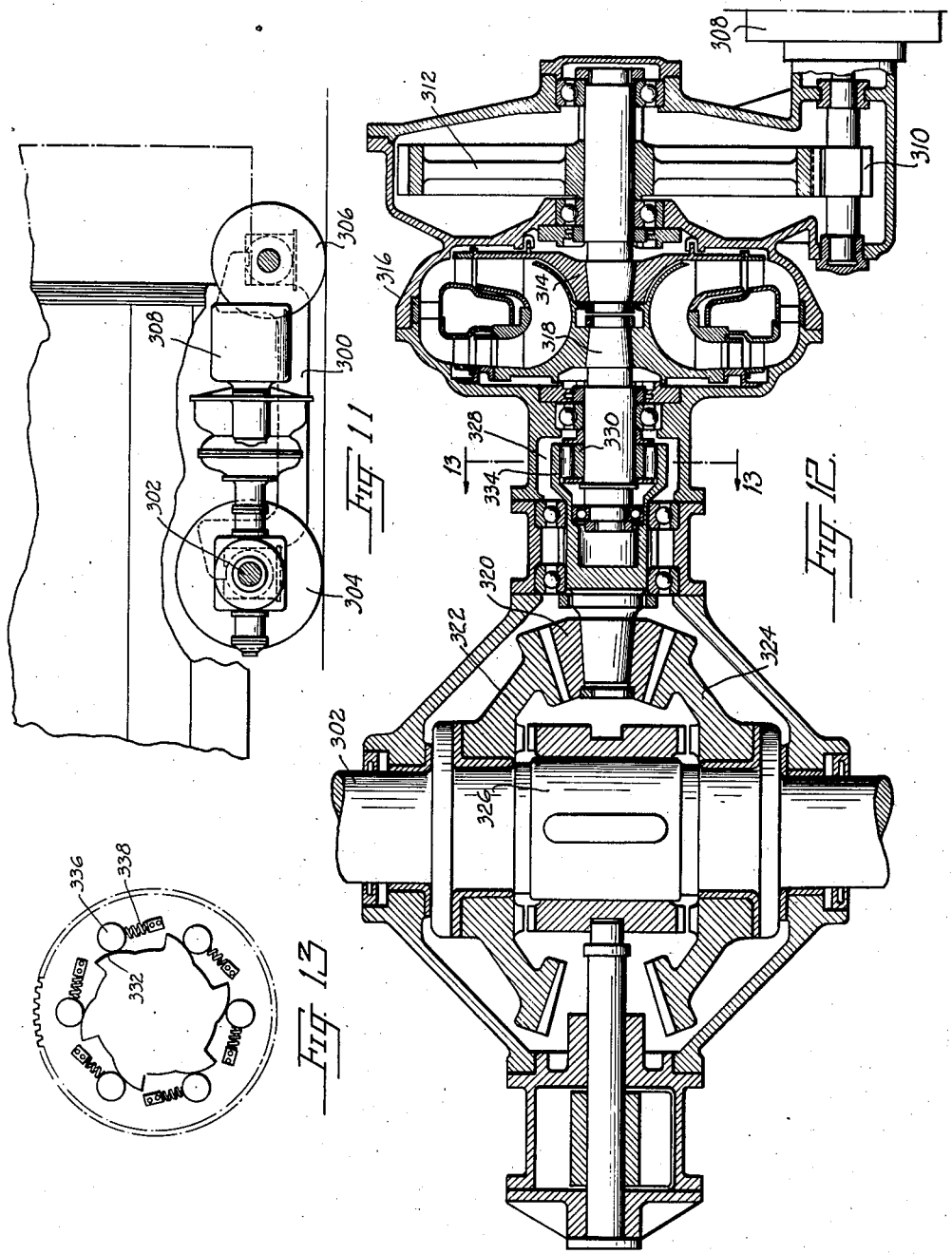

Patented July 29, 1941

2,250,543

UNITED STATES PATENT OFFICE 2,250,543

SELF-PROPELLED RAIL VEHICLE

Alf Lysholm, Stockholm, and Erik Otto Eriksson, Lidingo, Sweden, assignors to Aktiebolaget Ljungströms Ångturbin, Stockholm, Sweden, a corporation of Sweden Application June 6, 1938, Serial No. 212,044
In Great Britain June 7, 1937

4 Claims. (Cl. 105—38)

The present invention relates to self-propelled rail vehicles inclusive of railcars but more particularly locomotives. Still more particularly the invention relates to turbine driven vehicles of this kind in which power is transmitted from the turbine or turbines to the driving wheels through mechanism including mechanical gears.

In one of its aspects the invention contemplates the provision of mechanism for power transmission arranged so that the power of the turbine can be transmitted to the drivers by comparatively small and light gears of simple and relatively cheap construction and in such a way that the maximum of adhesion may be obtained between the drivers and the rails. It further contemplates provision of driving mechanism making it possible for the vehicle to follow curves with relatively small radii of curvature, with the prime mover and the driving mechanism so disposed that the weight of this portion of the vehicle is distributed symmetrically with respect to the plane of symmetry of the vehicle and divided as equally as possible between the drivers.

In another of its aspects, the invention contemplates the provision of power transmitting mechanism which will avoid the usual rigid connection between the drivers resulting from the usual side rods. Further in this aspect it contemplates the provision of an elastic drive the nature of which among other things provides for differential or compensating drive to drivers mounted on different axles, thus avoiding undue stress on the bearings, gears, and other parts of the mechanism which are imposed by rigidly constructed mechanisms which cannot compensate for unavoidable difference in driver diameters and similar causes productive of such stress in vehicles with multiple driving axles and rigid driving connections from a single prime mover.

Still another aspect of the invention contemplates the provision of improved power transmission mechanism for transmitting power to auxiliary drivers, commonly referred to as a booster, for obtaining additional tractive effort for starting and the like.

The detailed nature of the several objects contemplated by the invention in its several aspects and the manner in which these objects may be realized may best be understood from a consideration of the ensuing portion of this specification in which several embodiments of construction are described by way of example.

In the accompanying drawings forming a part hereof, in which the several embodiments are illustrated:

Fig. 1 is a more or less diagrammatic side view of the lower portion of a turbine driven locomotive embodying features of the invention, parts of the structure being broken away for the sake of clarity;

Fig. 2 is a top plan view partly in section of the trucks and power transmitting mechanism of the vehicle shown in Fig. 1;

Fig. 3 is a more or less diagrammatic view showing in outline the speed reducing gears of the transmission shown in Fig. 1 and viewing the apparatus as indicated generally by line 3—3 on Fig. 1;

Fig. 4 is a view similar to Fig. 3, showing certain parts in different position;

Fig. 5 is an elevation partly in section of a different form of part of the gear structure illustrated in the preceding figures;

Fig. 6 is a side elevation of a locomotive, broken away in part, showing another locomotive embodying features of the invention;

Fig. 7 is a top plan view of part of the structure shown in Fig. 6;

Fig. 8 is a horizontal plan view on a larger scale of a portion of transmission apparatus suitable for use in a system such as shown in Figs. 6 and 7;

Fig. 9 is a plan view of a part of one of the trucks shown in Fig. 6;

Fig. 10 is a section taken on the line 10—10 of Fig. 9;

Fig. 11 is a side elevation of part of a locomotive showing a booster drive embodying features of the invention;

Fig. 12 is a horizontal section on enlarged scale of part of the apparatus shown in Fig. 11; and Fig. 13 is a section taken on the line 13—13 of Fig. 12.

Referring now more particularly to the embodiment illustrated in Figs. 1 to 4, inclusive, the main frame of the locomotive is indicated at 10, this frame carrying the boiler and other usual locomotive equipment not illustrated. The frame is supported by two six-wheel trucks 12 and 14 pivoted respectively to the frame by the usual king pin mountings 16 and 18.

The prime mover in this instance comprises a turbine 20 from which power is transmitted to the drivers through a gear transmission comprising a primary reduction gear 22 and a secondary reduction gear 24.

The primary gear is mounted adjacent to the turbine and symmetrically with respect to the central plane of the locomotive as will be observed from Fig. 2. The turbine is located at the forward end of the locomotive beneath the smoke box portion of the boiler barrel. This gear comprises a pinion 26 fixed to the turbine shaft, which pinion meshes with two primary reduction gears 28 and 30.

The secondary reduction gear 24 is mounted centrally in the frame of the locomotive between the two trucks and comprises gears 32 and 34 connected respectively to gears 28 and 30 of the primary gear by shafts 36 and 38 extending longitudinally of the locomotive and advantageously connected at their ends to the gears through universal joints or other suitable flexible connections indicated at 40. Gears 32 and 34 are adapted to mesh with a common reduction gear 42 mounted on shaft 44 which extends through to the exterior of both sides of the secondary gear casing.

In the embodiment shown, each truck is provided with three pairs of drivers, those of truck 12 being indicated as 46, 48, and 50 and those of truck 14 being designated 52, 54, and 56. The drivers of truck 12 are interconnected by articulated side rods indicated generally at 58 and the drivers of truck 14 are similarly interconnected by side rods 60.

The axle 62 carrying the center pair of drivers 48 of truck 12 has mounted thereon a bevel gear 64 meshing with a pinion 66 carried by a suitable gear box 67 mounted around the axle. Pinion 66 is connected to one end of the reduction gear shaft 44 by means of shaft 68 provided with universal or flexible joints 70 and having a suitable connection such as is indicated at 72 for compensating for variations in distance between axle 62 on the truck and the reduction gear 24 in the frame. Similarly, the center axle of truck 14 is provided with a bevel gear 74 meshing with pinion 76 which is connected to the forward end of shaft 44 by means of shaft 78, joints 80, and connection 82.

The nature of the operation of the power transmitting mechanism will be largely apparent from the drawings. Assuming the turbine to rotate in right hand or clockwise direction as viewed from the rear of the locomotive, it will be evident from Fig. 3 that the shafts 36 and 38 connecting the primary and secondary reduction gears will rotate in counter clockwise direction and transmit clockwise motion to reduction gear 42 through gears 32 and 34. This in turn will cause shafts 68 and 78 to rotate in clockwise direction as viewed from the rear of the locomotive and these shafts will cause the axle gears 64 and 74, respectively, to rotate in clockwise direction as viewed in Fig. 1 to give forward drive to the locomotive, it being assumed that as previously stated that the turbine end of the locomotive is the forward end.

In order to secure drive of the locomotive in reverse direction without a reversing turbine, the secondary reduction gear is provided with a reversing idler gear 84 which is in constant mesh with the reduction gear 42. Gears 32 and 34 are mounted in known manner, which need not be described herein in detail, on eccentric bearings indicated respectively at 86 and 88, shiftable through any suitable operating mechanism to move these gears from the position shown in Fig. 3 to the position shown in Fig. 4 in which they are out of mesh with the reduction gear 42 and in mesh with the reverse idler gear 84. As will be apparent from Fig. 4, with the gears in this position the reduction gear 42 will be caused to rotate in the opposite or reverse direction from that indicated in Fig. 3.

In order to eliminate the possibility of the production of undue stresses in the connections between shaft 44 and axle gears 64 and 74, which might be set up due to differences in diameters between the drivers 48 and the drivers 54 which are rigidly connected to be driven at the same speed, a differential drive may in some instances advantageously be provided to the shafts 68 and 78. Conveniently, this may be done by utilizing the reduction gear 42' (Fig. 5) as a carrier upon which differential pinions 90 are mounted, these pinions meshing on one side with a bevel gear 92 adapted to be connected to one of the shafts, for example shaft 78, and meshing on the other side with a bevel gear 94 adapted to be connected to the other of the shafts, for example shaft 68.

When such a differential drive is employed, some form of locking arrangement for putting the differential out of action may in some instances advantageously be employed. With the differential drive it will be evident that if for any reason such as a local oily condition on the track, one of the trucks should lose its traction, the spinning of the wheels of one truck would deprive the other truck of tractive effort, in which case it might be necessary to lock the differential in order to move the vehicle through the medium of the truck having tractive effort at the rails. The means for locking the differential may be of any one of a number of different and well known kinds of device for locking such apparatus, which need not be described herein in detail and which may, for example, comprise a splined shaft shiftable to a position engaging and locking against relative rotation the two aligned shafts upon which the differential bevel gears 92 and 94 are mounted.

It will be apparent that with the arrangement just described, several important practical advantages are obtained. For example, it will be seen that the pivot connections through which drive is transmitted from the secondary gear to the trucks are relatively close to the pivot points of the trucks so that relatively small angles of deviation are obtained between the axes of the drive shafts and of the trucks when the vehicle is travelling on a curve. Also, it will be apparent that even a relatively large locomotive may readily follow curves with small radii of curvature because of the short overall length of each of the independently pivoted driving trucks. The weight is substantially symmetrically distributed and all of the weight of the locomotive may be used to produce adhesion of the drivers. Further, the gearing and shafting comprising the driving mechanism may be made relatively very light and simple in its construction even when the amount of power to be transmitted is relatively great.

In so far as the specific construction of the trucks and the arrangement of the drivers is concerned, many different variations may be resorted to, depending upon the specific kind of rail vehicle to which the invention is applied. Thus, all wheels need not be drivers. The wheels on one axle of each of the trucks may be used as leading or trailing wheels as the case may be and of those wheels used as drivers, various connections between the driving axles may be used instead of the side rods illustrated. Gear connections between axles may be employed and where gearing between axles is used, the wheels of the axle to which drive is transmitted from the secondary reduction gear may be of larger diameter than the remaining driving axles which among other things may advantageously operate to reduce the angularity of the drive through the universal or flexible joints in the shafts transmitting power to the trucks. Obviously, drive may be transmitted from the secondary reduction gear to any desired truck axles and other specific forms of gears, such as worm or hypoid gears may be used to transmit the drive from the shafts to the axles.

Referring now to Figs. 6 to 10, another arrangement is illustrated which provides elastic drive to the driving wheels of the vehicle and which further provides for separate or independent connection between each driving axle and the source of power. In the embodiment illustrated, the mechanism is shown as applied to a locomotive but it will be apparent that it is equally applicable to other forms of rail vehicles. In this instance the prime mover consists of a turbine 100 which is mounted substantially centrally of the frame 102 of the locomotive. The locomotive is carried by two trucks 104 and 106 pivoted respectively at 108 and 110 to the locomotive frame through the usual king pin connections. Truck 104 has two driving axles providing two pairs of drivers 112, and 114, and a pair of leading guide wheels 116. Truck 106 has two pairs of drivers 118 and 120 mounted respectively on driving axles 122 and 124 and is further provided with trailing guide wheels 126.

The shaft of turbine 100 extends through the casing at each end thereof and is provided with pinions 128 and 130 at the opposite ends of the shaft. Pinion 128 meshes with two reduction gears 132 and 134 while pinion 130 meshes with similar gears 136 and 138. Each of these gears drives the primary shaft of elastic driving means which is preferably in the form of a hydraulic torque converter. In Fig. 7 the converters are indicated at 140, 142, 144, and 146, being driven respectively by gears 132, 134, 136, and 138. Power is transmitted from the secondary shafts of the converters respectively to the driving axles through longitudinally extending shafts 148, 150, 152, and 154. Since the drive to the truck axles from the centrally located gearing is the same to both front and rear trucks, it will be sufficient to describe this drive for one of the trucks, and this drive is illustrated more in detail in Fig. 9 showing the driving axles of the rear truck 106. Axles 122 and 124 have mounted thereon respectively gear boxes 156 and 158, the gearing within each of these boxes being the same and that in box 156 being shown in the figure. This gearing comprises a bevel pinion 160 meshing with two bevel gears 162 and 164 loosely mounted on axle 122. Between these latter gears there is splined or keyed on the axle a sliding collar 166 having teeth or dogs at its ends adapted to engage similar teeth or dogs on one or the other of gears 162, 164. It will be evident that with a given direction of rotation of the drive shaft 154, the direction of drive of axle 122 for forward or reverse will be determined by shifting collar 166 to engage one or the other of gears 162, 164, which gears are rotated in opposite directions by the pinion 160. Any suitable means may be employed for controlling the position of the collar 166. In the embodiment illustrated this is accomplished by means of a control shaft 168 having an eccentric pin 170 seated in a groove in the collar. At its outer end shaft 168 has fixed to it a vane 172 (Fig. 10) operating in a chamber formed by a casing 174. A web 176 in the casing extends inwardly into contact with the hub from which the vane 172 projects and there is thus formed in the casing two chambers 178 and 180 to which fluid may be admitted or withdrawn respectively through the ports 182 and 184. The casing is further provided with stops 186 for limiting the extent of turning movement of vane 172 and as will be apparent in Fig. 10, shaft 168 can be rotated through an arc of 180° by admitting pressure fluid to one or the other of the chambers while allowing such fluid to escape from the other. Such movement of the shaft will evidently operate through the eccentric pin to shift the reversing collar so as to enable it to engage one or the other of the axle gears. Any suitable form of control for the pressure fluid may be employed and it will further be evident that other forms of operating means may be used to shift the reversing collar.

As will be obvious from the drawings, the power transmitting shafts 148—154 must be connected through suitable universal or flexible joints which have been indicated on the drawings at 188.

In Fig. 8 there is shown on enlarged scale and in section a part of the gearing and hydraulic torque converter arrangement indicated in Fig. 7, modified by the addition of a further control. As will be observed from this figure, the reduction gear 138 driven by the turbine pinion 130, drives the primary shaft 190 of the converter 146. The converter is of known construction and comprises a pump wheel 192 carried by the primary shaft and having a row of pump blades 194 for circulating operating liquid in a closed path of flow in chamber 196 formed by the converter casing. The secondary shaft 198 of the converter, from which drive is transmitted to the truck axle, carries a turbine wheel 200 on which are mounted three rows or stages 202, 204, and 206 of turbine blading through which the working fluid circulates. Interposed between these stages are rings of fixed guide blades 208 and 210.

In the modification illustrated, the primary shaft 190 is carried through the gear casing at its forward end and has mounted thereon a brake which in the form shown consists of a brake drum 212 and a friction band brake 214 operable through any suitable means to engage the drum 212.

The operation of the apparatus just described will be largely evident from the illustrations, power being transmitted from the turbine through the reduction gears which constitute primary gearing to the torque converters which constitute a secondary reduction gearing, and from the latter independently to each of the driving axles.

In addition to securing elasticity of drive to the various driving axles, it is also very desirable and important to secure equalization of power transmission from the common source of power to the different axles. In this connection it is important to note that this desirable result is obtainable with a variable speed torque converter of the kind illustrated, but is not obtainable through the use of hydraulic clutches or couplings. In hydraulic clutches or couplings, a slight variation of their slip due to slight differences between the driver diameters would result in a considerably unequal power transmission from the common prime mover to the different

*drivers. For example, if the slip of the hydraulic* clutches is normally 2 per cent, the secondary shafts of the clutches will rotate at a speed of 98 per cent of the primary shaft speed. Assuming the diameters of one pair of drivers being slightly greater than that of the other one so that the slip of the appertaining clutch will be increased by one per cent, then the power transmitted by this clutch will be increased by 50 per cent and the power transmitted by the other clutch will be decreased correspondingly. On the other hand, a variation of the slip of a hydraulic variable speed torque converter by one per cent only results in a variation of the power transmitted by three per cent so that the equalization of the power transmission will not be noticeably altered.

In addition to elasticity of drive and equal power distribution which is afforded by the use of hydraulic torque converters, the concerters also make it possible for the vehicle to be driven by a prime mover operating at substantially constant speed. This enables a small, light, and comparatively cheap high speed turbine to be used. Further, since the torque converters operate as speed reducing units, because in the normal operation of such devices the maximum secondary shaft speed is always materially less than the primary shaft speed, a comparatively low mechanical gear reduction in addition to the converters provides sufficient overall speed reduction to permit a high speed turbine to be connected to the drivers of a rail vehicle. This in turn makes it possible to use relatively inexpensive mechanical gearing.

In instances where a drive of the type just described is applied to a rail vehicle the direction of drive of which must be changed frequently, as for example in the case of a switching locomotive, it may be advantageous to provide means for applying braking force to the turbine rotor to bring it quickly to rest. Where reversal is effected by means of positive jaw clutches of the kind shown in Fig. 9, it is evidently not feasible to effect reverse while power is applied to the gearing, and where a turbine is used in conjunction with an elastic drive, braking of the vehicle to a stop will not operate to bring the turbine rotor to a stop. The speed of the turbine rotor will be very rapidly reduced from its normal operating speed to an intermediate speed by the resistance of the pumps or impellers of the hydraulic torque converters, but since the resistance offered by these elements varies as the cube of their speed, it will be evident that an appreciable time may be required to bring the turbine rotor to a full stop, because of the low resistance of the impellers at low speeds. In order to quickly bring the turbine rotor to a complete stop, it is accordingly advantageous to provide some suitable form of braking means which may be applied to reduce the time necessary to bring the turbine to a full stop so that reversal of the gearing may be effected.

In many instances it is advantageous to provide, in addition to the main power plant, additional power for increasing starting tractive effort. This is usually accomplished by means of a booster intended to be used only at comparatively low vehicle speeds to produce additional traction for starting purposes. An improved form of booster drive in accordance with the present invention, as illustrated in Figs. 11 to 13, will now be described. In the embodiment shown in these figures, a separate booster truck 300 is employed having a driving axle 302 to which are attached two drivers 304 and having a second axle upon which are mounted the trailer wheels 306. This truck may advantageously be pivotally mounted by the usual king pin construction under the rear end of a locomotive, to form the trailing truck thereof, as indicated in Fig. 11. In its preferred form the booster drive comprises a turbine 308 on the shaft of which is mounted a pinion 310 meshing with a reduction gear 312 providing a primary gear reduction. The gear 312 is fixed to the primary or pump shaft 314 of a variable speed hydraulic torque converter 316 of the kind previously described herein, the secondary shaft 318 of which drives a bevel pinion 320 meshing with axle gears 322 and 324. These latter gears are loosely mounted on axle 302 and a sliding collar 326 is provided, which is keyed or splined on the axle and shiftable to provide driving connection between the pinion and the axle, and one or the other of gears 322 or 324, in the manner previously described in connection with the portion of the main drive illustrated in Fig. 9.

The pinion 320 is driven by the secondary shaft of the converter through the medium of an overrunning or freewheel clutch 328 which may be of any suitable construction. In the form illustrated, this clutch comprises an inner race 330 fixed to the converter shaft and provided with a series of cam surfaces 332. Between these surfaces and the outer race 334, which is attached to the pinion shaft, a series of clutch rollers 336 is resiliently held in engagement by any suitable means such as springs 338.

A booster drive of the kind just described provides numerous advantages over previous forms of drive for this purpose. In the first place the use of a turbine results in the application of even torque to the booster wheels which is highly advantageous since these wheels are in use primarily under conditions where high and even tractive effort is most needed. Turbine drive for the booster also permits the booster engine to be of small and light construction owing to the high speed at which the turbine may be operated. The elastic drive provided by the torque converter is obviously advantageous and the converter, acting as a secondary speed reducing gear, enables the advantages of a light, high speed turbine to be taken advantage of with a minimum of mechanical gearing.

Automatic disconnection of the booster drive when the vehicle speed reaches a predetermined value is highly desirable and this may be accomplished when a converter is used by emptying the working chamber of the converter, thus rendering it inoperative to transmit power, or as in the embodiment illustrated, the drive may automatically be disconnected through the medium of an overrunning clutch. It will be evident that with a governed maximum turbine speed, the clutch will overrun when a predetermined axle speed is reached which exceeds the maximum speed which can be transmitted to the secondary shaft of the converter from the turbine.

Further, the valve for controlling the supply of motive fluid to the turbine may readily be interconnected so as to be automatically closed when power transmission to the booster wheels is automatically interrupted either by the overrunning clutch or through emptying of the converter. With such interconnection, no attention on the part of the operator of the vehicle is required in connection with the booster drive.

It will be evident from the foregoing that the several features presented by the invention in its different aspects may be employed in many different ways to effect the desired drive in different types of rail vehicles in which the driving axles, either main or booster, are mounted either on pivoted trucks or directly in the vehicle frame. It will further be evident that certain features of the invention may be used to the exclusion of others. The specific forms of construction hereinbefore described by way of illustration may evidently be modified in many different ways without departing from the principles or scope of the invention, as defined in the appended claims.

What is claimed:

1. In a locomotive, a frame, two spaced articulated trucks for supporting said frame, each of said trucks having at least two driving axles, an elastic fluid turbine, primary reduction gearing driven by said turbine, said primary reduction gearing comprising a set of reduction gears located at each end of the turbine, each of said sets comprising a pinion secured to an end of the turbine shaft and a pair of reduction gears each meshing with said pinion, secondary reduction gearing comprising two pairs of torque multiplying variable speed hydraulic torque converters with the respective converters of each pair directly connected to the pairs of reduction gears, said converters being continuously filled with working liquid during normal operation of the vehicle and transmitting power continuously through said liquid at all loads and speeds within the normal operating range of the vehicle, said turbine, said primary gearing and said secondary gearing constituting a power unit carried by the frame between said trucks with the converters extending axially at the opposite ends of the unit, and a plurality of generally longitudinally extending articulated shaft conections for transmitting power from each converter independently to a different driving axle.

2. In a locomotive, an elastic fluid turbine constituting the main prime mover of the locomotive, a plurality of articulated trucks having driving axles, a primary mechanical reduction gearing driven by the turbine, secondary reduction gearing driven by the primary gearing, said secondary reduction gearing comprising a plurality of torque multiplying variable speed hydraulic torque converters, said converters being continuously filled with working liquid during normal operation of the vehicle and transmitting power continuously through said liquid at all loads and speeds within the normal operating range of the vehicle, articulated shaft connections and axle gears for transmitting power from a different one of said converters to at least one of the driving axles of each of said trucks, means associated with said axle gears for reversing the direction of drive to said axles, and braking means positively connected with the turbine rotor for bringing the rotor to rest to permit said reversing means to be actuated.

3. In a rail vehicle, a driving axle, an elastic fluid turbine, power transmitting mechanism for transmitting power from the turbine to the axle including a primary mechanical reduction gear driven by the turbine, a secondary reduction gear comprising a torque multiplying hydraulic torque converters of the type adapted to be continuously filled with working liquid and to continuously transmit power during normal operation of the vehicle, and mechanical reversing means interposed between the converter and the axle, and braking means mechanically connected with the turbine rotor for bringing the rotor to rest to permit said reversing means to be actuated.

4. In a locomotive, a frame, two spaced articulated trucks for supporting said frame, each of said trucks having at least two driving axles, an elastic fluid turbine, primary reduction gearing driven by said turbine, said gearing comprising two sets of gears located respectively at opposite ends of the turbine and each set including a driving pinion secured to an end of the turbine rotor shaft, two sets of secondary reduction gearing driven by said sets of primary gearing respectively and each comprising hydraulic torque multiplying converter apparatus of the kind continuously filled with working liquid during normal operation of the vehicle and transmitting power continuously to said liquid at all loads and speeds within the normal operating range of the vehicle, said turbine, said primary gearing and said secondary gearing constituting a power unit carried by the frame between said trucks, each of said sets of secondary reduction gearing providing at least two turbine elements independent of each other with respect to speed of operation and driven by said working liquid, and a plurality of generally longitudinally extending articulated shaft connections for transmitting power from each of said turbine elements independently to a different driving axle.

ALF LYSHOLM.
ERIK OTTO ERIKSSON.